(12) United States Patent
Camenisch et al.

(10) Patent No.: US 8,763,454 B2
(45) Date of Patent: Jul. 1, 2014

(54) CAPACITIVE MEASURING METHOD AND APPARATUS FOR FILL LEVEL DETECTION AND CORRESPONDINGLY EQUIPPED LABORATORY EQUIPMENT

(75) Inventors: Johann Camenisch, Chur (CH); Werner Hinn, Stafa (CH); Lars Kamm, Schänis (CH); Simon Kuenzi, Feldmeilen (CH)

(73) Assignee: Tecan Trading AG, Mannedorf (CH)

( * ) Notice: Subject to any disclaimer, the term of this patent is extended or adjusted under 35 U.S.C. 154(b) by 306 days.

(21) Appl. No.: 13/075,703

(22) Filed: Mar. 30, 2011

(65) Prior Publication Data

US 2011/0239757 A1 Oct. 6, 2011

Related U.S. Application Data

(60) Provisional application No. 61/319,479, filed on Mar. 31, 2010.

(51) Int. Cl.
*G01F 23/26* (2006.01)
(52) U.S. Cl.
CPC .................................. *G01F 23/266* (2013.01)
USPC ....................................................... 73/304 C
(58) Field of Classification Search
USPC ............................................ 73/304 C, 304 R
See application file for complete search history.

(56) References Cited

U.S. PATENT DOCUMENTS 6,095,629 A * 8/2000 Froger et al. ...................... 347/7

FOREIGN PATENT DOCUMENTS

| DE | 19645970 A1 | 5/1998 |
|----|----|----|
| FR | 2765329 A1 | 12/1998 |
| FR | 2765331 A1 | 12/1998 |
| FR | 2875007 A1 | 3/2006 |
| GB | 2040464 A | 8/1980 |
| JP | 11014430 A | 1/1999 |
| WO | WO 2006108811 A1 | 10/2006 |
| WO | WO 2008064500 A2 | 6/2008 |

* cited by examiner

*Primary Examiner* — Peter Macchiarolo
*Assistant Examiner* — Tamiko Bellamy
(74) *Attorney, Agent, or Firm* — Notaro, Michalos & Zaccaria P.C.

(57) ABSTRACT

The invention relates to apparatuses (100) for the capacitive determination of the fill level in the individual containers (5.1, 5.2) of a group (10) of regularly disposed containers of the same dimensions, wherein the apparatus (100) comprises a transmitter electrode (201.1) and a receiver electrode (201.2, 201.3) as well as a circuit for carrying out a capacitive measurement. The measuring circuit comprises a transmitting circuit (57) and a receiving circuit (58) and the apparatus (100) comprises a horizontal base plate (200) having a plurality of electrodes (201.1, 201.2, 201.3) which protrude in one direction in relation to a horizontal plane defined by the base plate (200) and which are uniformly mutually spaced apart such that a plurality of working zones of the same dimensions are formed. A plurality of connections (202) are provided through which some of the electrodes (201.1) are connectable to the transmitting circuit (57) and controllable by said circuit and some of the electrodes (201.2, 201.3) are connectable to the receiving circuit (58) and can be read out by said circuit. In the area of each working zone in the horizontal plane at least respectively two electrodes (201.1, 201.2, 201.3) are opposite one another. By means of the connections (202) respectively one of these two electrodes (201.1) will be used as transmitter and the other of the two electrodes (201.2, 201.3) will be used as receiver.

20 Claims, 12 Drawing Sheets

R=4
Sp=5
N=20
K=15

R=4
Sp=5
N=20
K=15 (active,
15 (permanently
grounded)

R=4
Sp=5
N=20
K=15 (active,
15 (permanently
grounded)

CAPACITIVE MEASURING METHOD AND APPARATUS FOR FILL LEVEL DETECTION AND CORRESPONDINGLY EQUIPPED LABORATORY EQUIPMENT

The invention relates to capacitive measuring methods and apparatus for fill level detection and correspondingly equipped laboratory equipment. In particular, the invention is concerned with laboratory equipment which is designed to determine the fill level in a plurality of containers.

BACKGROUND OF THE INVENTION

Capacitive sensors are used in some cases to measure physical quantities such as, for example, pressure, fill level, volume, or the relative dielectric index. These sensors detect a change of the capacitance of an individual capacitor or an entire capacitor network, which is obtained as a response to a physical quantity to be measured. The physical quantity to be measured can thus be observed by measuring the capacitance of the sensor. Capacitive sensors are either used individually or in arrangements of multiple spatially closely adjacent sensors. Capacitive single sensors are used, for example, for pressure, acceleration, and position measurement. Capacitive arrangements respectively multiple sensor systems are used, for example, in a capacitive touch-pad or in capacitive fingerprint sensors.

FIG. 1 shows an example of a schematic illustration of a capacitive sensor arrangement 1 having multiple capacitive (measuring) sensors, which are formed here by a common transmitter electrode S and a plurality of receiver electrodes E1, E2, . . . . A common transmitter electrode S is used for all the sensors. The receiver electrodes E1, E2, . . . are located spaced apart from the transmitter electrode S. A signal source 2 is provided for activating or for operating the sensor arrangement 1. Using such a sensor arrangement 1 having multiple capacitive sensors, three-dimensional dielectric or conductive structures may be detected and scanned. For example, the embossed image of a coin (example of a conductive structure) or the fill level of a microplate, as is used, for example, in pipetting automats (example of a dielectric structure) may be detected and scanned. Details on this approach can be obtained from the publication WO 2008/064500 A2.

There are numerous laboratory systems and medical as well as pharmaceutical devices in which it is important to determine the content or fill level in test tubes, microplates, or the like. Such a determination is important particularly when the automation of measurement or experimental sequences is involved. The fill level is typically determined by means of a detection of the liquid level, i.e. the position of the phase boundary between air and liquid is determined. This process is also designated as Liquid Level Detection (LLD). In the so-called Liquid Arrival Check (LAC) it is determined whether liquid has arrived in a container or whether the volume or the amount of liquid has changed.

Over the last few years, laboratory equipment has become increasingly precise and more complex. The trend is towards high integration, automation, and parallelism. This leads to a high spatial compaction of the individual components. This compaction brings with it not only mechanical and other technical problems but also the accuracy of the electronic evaluability since mutual influencing of neighboring measuring channels by crosstalk and other aspects can lead to problems.

There are various devices which operate with plates or containers having a large number of liquid containers in a very confined space. Here special mention may be made of microplates or multiwell plates or microtiter plates (cf. ANSI/SBS Standard 1-2004), which, for example, have 96 closely adjacently located liquid containers (called "wells"). Sometimes, these microplates are not accessible from the rear side since the microplates are either designed to be solid on the rear side or since they have numerous webs and other elements to give the microplate stability for handling. The invention nevertheless intentionally goes the way of electrode pairs disposed on the rear side to achieve a contact-free fill level measurement.

Previous solutions for determining fill levels, which for example operate on the basis of ultrasound, typically require several minutes to measure a microplate. In addition, ultrasound approaches are relatively inaccurate and afford a resolution of only 25 µl. Foam, meniscus effects, and other geometric effects cannot be reliably be determined or identified by such ultrasound approaches.

There are solutions which make a capacitive measurement of the fill level of a container by means of electrodes. An exemplary solution is known, for example, from the Document GB 2040464 A. In this solution, two parallel electrode plates are fastened firmly on the container. The said document is concerned with fill level measurement in tanks such as, for example, water tanks and the like. A further capacitive measuring method for determining the fill level in a container is known from the Unexamined Laid-Open Patent Application DE 196 45 970 A1. According to this Unexamined Laid-Open Patent Application, a transmitter electrode and a receiver electrode are located opposite one another. The electrodes are connected by means of a measuring circuit. Another approach which provide a firm connection of the electrodes with the containers is known, for example, from the document JP 11014430 A (Application number JP 19970166153). The solution according to JP 11014430 A is concerned with determining the position of the liquid surface in containers.

These approaches cannot be adapted to the situation in complex laboratory systems and medicinal as well as pharmaceutical equipment, or they can only be adapted with effort. In particular, these approaches do not yield sufficient resolution for the individual determination of the fill level in closely adjacent containers. In addition, the indicated solutions would be too expensive if they were to be applied to groups comprising a large number of containers. In addition, the attainable measurement accuracy is not sufficient.

With the increasing degree of automation of laboratory equipment, it is desirable to configure the corresponding process sequences so that only a few manual interventions are required. At the same time, it should be borne in mind that, for example, in automated laboratory equipment, situations may occur which cannot be solved automatically by previous automated laboratory equipment.

The document WO 2008/064500 A2 is considered to be closest prior art.

It is therefore the object to provide an apparatus and a method for determining the fill level or detecting the amount of a medium, e.g. an amount of liquid, in a plurality of closely adjacent containers. The apparatus or the method should provide a reliable and accurate result at any time even when measuring the fill level in a group of containers. In addition, it is concerned with providing a corresponding laboratory device.

The method or the apparatus or the laboratory equipment should preferably be designed so that it requires no manual intervention.

The apparatus should be designed as far as possible so that it can integrated as a module or component in other (laboratory) equipment or it can be attached to this.

These objects are achieved according to the invention by an apparatus according to claim 1, by a method according to claim 13, and by laboratory equipment according to claim 12.

The apparatus according to the invention is characterized by the characterizing features of claim 1. The method according to the invention is characterized by the characterizing features of claim 13 and the laboratory equipment according to the invention is characterized by the characterizing features of claim 12.

The invention is based on a measurement by means of a capacitive net or network of a plurality of electrodes. In some embodiments, the electrodes are designed as individual electrodes, which are not connected to the containers or even integrated in the containers. In other embodiments the electrodes can be firmly disposed in or on the containers. In all the embodiments, the capacitive net or network can preferably be configured before or during the execution of a measurement method by adapting, for example, the wiring of the electrodes.

In all the embodiments, the invention is based on the principle that each medium that comes between a transmitter electrode and a receiver electrode influences the received signal. The strength of the signal influence depends on the number of electric charges which can be accumulated or displaced in the medium. These charges originate from dielectric media (bound polarization charges), which is the case, for example, with distilled water or plastic. The charges occur in conducting media in the form of free surface charges. This is the case, for example in salt water, blood, metal etc. In a non-conducting medium, a capacitance increase is obtained through the corresponding dielectric constant. This effect of capacitance increase correlates with the volume of the medium between the electrodes. In conducting media, on the other hand, there are only the aforementioned surface charges. Here it is therefore a question of the geometry of the medium (e.g. the size of the entire surface) and not only the volume. Furthermore, it should be noted that conducting media become non-conducting above a specific frequency (called the Maxwell frequency).

In preferred embodiments, the invention is furthermore based on the approach that at least some of the electrodes can acquire various predefined voltage potentials as desired through the adaptation of the wiring and that as a result various parasitic capacitances in the capacitive network of electrodes can be rendered ineffective.

The invention is also based on the finding that in a capacitive fill level measurement, the received signals depend directly on the resistance or capacitance, i.e. the dielectric constant, of a liquid and therefore on the amount of liquid. In addition, the geometric arrangement of the containers and electrodes plays a role here.

As a result of the invention, it is possible to provide universal apparatus and laboratory equipment, which deliver reliable detection results in the most diverse situations and subject to the most diverse requirements.

The apparatus according to the invention, the laboratory equipment according to the invention, and the method according to the invention are now explained in detail with reference to schematic drawings of exemplary embodiments which do not restrict the scope of the invention.

Figure 1:
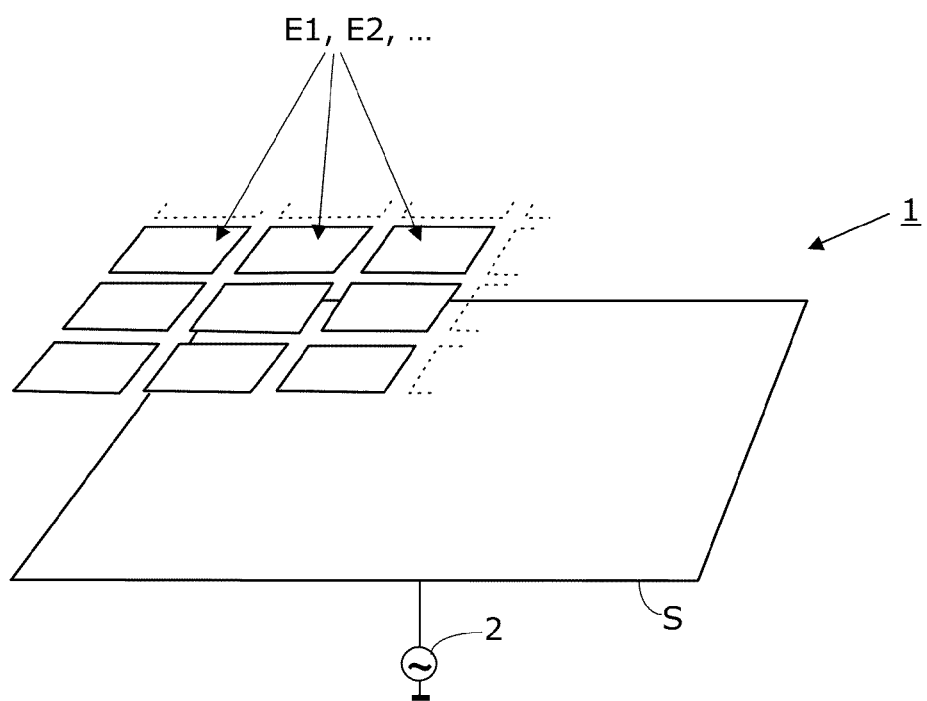
FIG. 1 shows a schematic side view of a part of a laboratory device according to the prior art.

Advantageous embodiments of the invention are described hereinafter, these comprising exemplary embodiments. These comprise both various configurations of the entire invention and also assemblies and individual parts of the invention. In principle, the assemblies and individual parts of the various embodiments described can be combined within one another or the assemblies and individual parts of individual embodiments can be replaced by the assemblies and individual parts of other embodiments. The combinations hereby formed may necessitate smaller adaptations familiar to any person skilled in the art and therefore not described further, for example, in order to enable a cooperation or intermeshing of the assemblies and individual parts.

Reference is made hereinafter to multiple structural elements or components in their entirety, by using corresponding reference numbers without indexes or additions. The electrodes are for example designated in their entirety with the reference number 201. Individual electrodes, on the other hand, are designated with 201.1 to 201.K (K here is an integer greater than or equal to 3). The other reference numbers are used similarly.

In connection with the present invention there is variously talk of laboratory equipment 400. This comprises equipment, systems, installations, apparatus, handling centers (also designated as "work station" or "liquid handling platform" and available, for example, under the trade name Freedom EVO® from Tecan Trading AG), and the like, which are equipped, for example, with means for liquid detection. The apparatus 100 according to the invention is an element, an assembly or a component of such laboratory equipment 400. A laboratory equipment item 400 can, for example, comprise a plurality of identical apparatuses 100 or a plurality of different apparatuses 100. The apparatus 100 according to the invention can, however be used not only for detecting liquids but also for detecting other media (e.g. powder, granules, flakes or the like).

The term module is used here to describe a functional group which is implemented in hardware, software, or as a combination of hardware and software.

The term "group" 10 is used here to describe a regular arrangement of a plurality of containers 5 which are the same or of the same type. The containers 5 are arranged in a regular arrangement horizontally tightly adjacent to one another, i.e. the containers 5 are arranged uniformly distributed over a plane. The containers 5 preferably all have the same shape and size, and are upright. The containers 5 of one group 10 are preferably arranged in a grid network comprising a plurality of rows R and columns Sp. In the regions of intersection of the rows R and columns Sp, there are empty positions (called working zones), which are all occupied by respectively one container 5 in a fully occupied grid. However, groups are also possible in which not all the empty positions are occupied.

The grid network at the same time defines the working zones. These working zones in the sense of the invention comprise intermediate spaces in each case between an electrode 201 serving as transmitter S and a spaced-apart (neighboring) electrode 201 serving as receiver. Depending on the embodiment of the electrodes 201, the working zone has a circular cross-section (relative to a horizontal plane E defined by the base plate 200), which approximately corresponds to the external cross-section of the containers 5. The three-dimensional shape of the working zones can, for example, have a cylindrical shape or it can comprise the shape of a cone or truncated cone (for example, in the embodiment according to FIG. 11). In a preferred case, the shape of the working zones corresponds to the external shape (shell shape) of the containers 5.

In FIGS. 2A-2E, 3, 12, 13, 14, 15, 17A, 17B, 18, 19A, 20, 21 and 22, the horizontal plane E lies in the plane of the drawing.

Figure 2A:
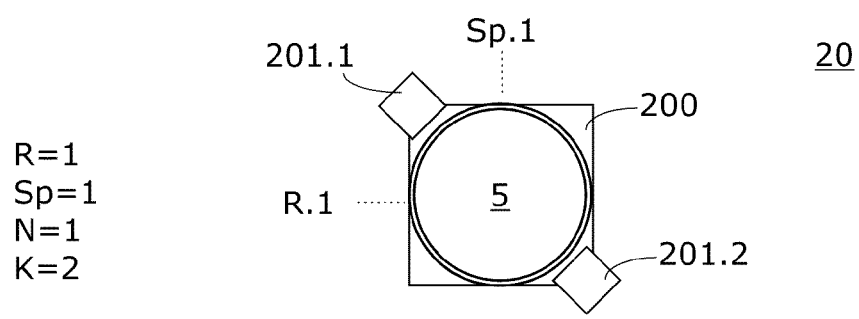
FIG. 2A shows a schematic plan view of a single container having two diametrically opposite electrodes according to the invention.

FIG. 2A shows a basic module 20 of a group 10 according to the invention. FIG. 2A shows a grid having one row R.1 (R=1) and one column Sp.1 (Sp=1), which defines only one single empty position. A single container 5 is located at this one empty position. Two pillar-like electrodes 201.1, 201.2, which are diametrically opposite to one another, are shown here. A first electrode 201.1 is located top left and a second electrode 201.2 is located bottom right.

FIGS. 2B to 2E show several examples of groups 10 according to the invention, each comprising pillar-like electrodes 201. The electrodes 201 can, however, also have a different shape, as is described further below.

The following nomenclature is now used for the representation and description of the groups 10: R gives the number of rows; Sp gives the number of columns, a grid having columns and rows, which are perpendicular to one another and of which the column width (called column spacing AS) and row height (called row spacing AR) are preferably identical. If AS=AR, squares are thus obtained as empty positions. N gives the total number of containers 5 and K the total number of electrodes 201. The individual columns are distinguished as follows: Sp.1 defines the first column Sp.2 defines the second column, and so on. The individual rows are distinguished as follows: R.1 defines the first row, R.2 defines the second row, and so on.

Figure 2B:
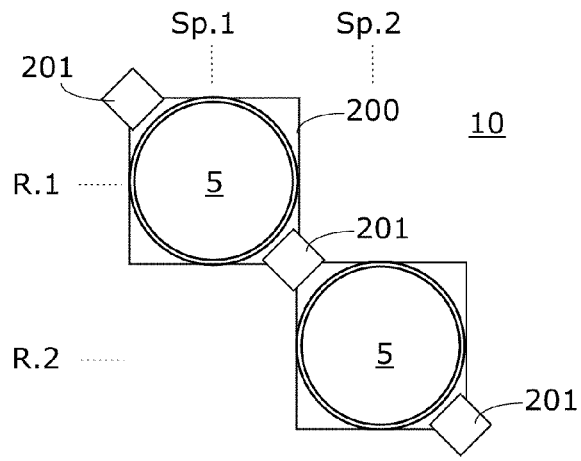
FIG. 2B shows a schematic plan view of a linear group of two containers with is three electrodes according to the invention.

FIG. 2B shows a first linear group 10, which is defined as follows: R=2, Sp=2, N=2, K=3. This therefore comprises a group 10, in which not all the empty positions are occupied.

Figure 2C:
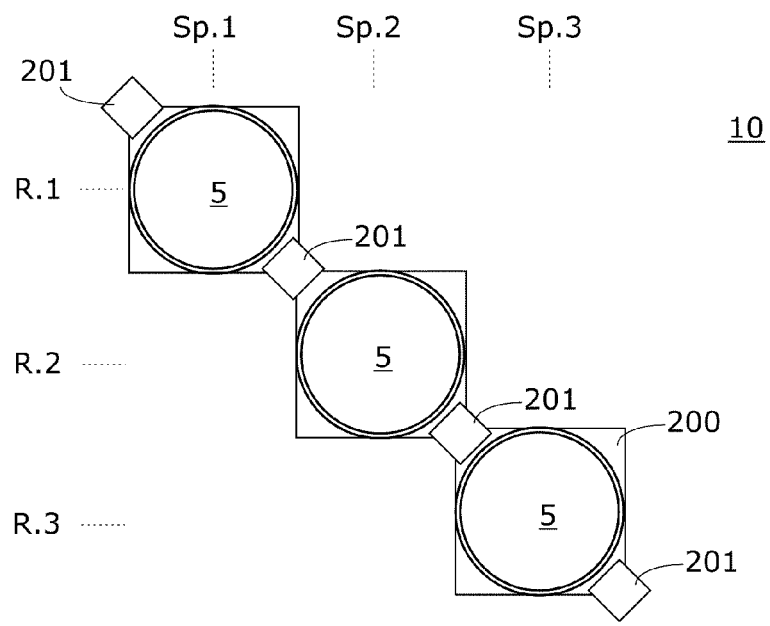
FIG. 2C shows a schematic plan view of a linear group of three containers with four electrodes according to the invention.

FIG. 2C shows a second linear group 10, which is defined as follows: R=3, Sp=3, N=3, K=4. This therefore comprises another group, in which not all the empty positions are occupied.

Example numerical values for larger linear groups 10 can also be deduced from the following Table 1. A distinction is made here between active and passive electrodes 201. An active electrode serves as transmitter (S) and/or receiver (R) and/or virtual ground. Passive electrodes are grounded, i.e. they lie at ground potential.

TABLE 1

| linear groups 10 | | |
| --- | --- | --- |
| Number of containers (N) | Total number of active electrodes 201 | Number of active electrodes 201 per container 5 |
| 2 | 3 | 1.5 |
| 3 | 4 | 1.33 |
| 4 | 5 | 1.25 |
| 5 | 6 | 1.2 |

Figure 2D:
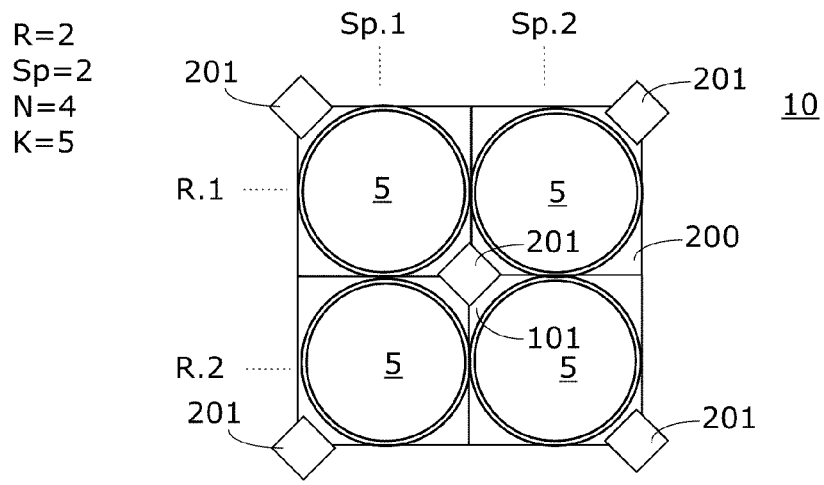
FIG. 2D shows a schematic plan view of a planar group of four containers with five electrodes according to the invention.
Figure 2E:
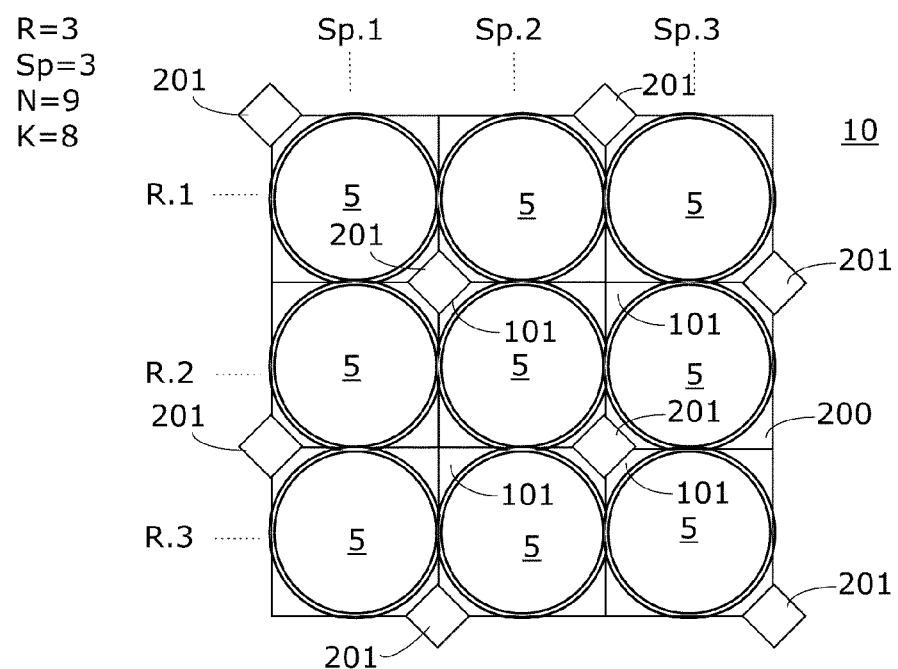
FIG. 2E shows a schematic plan view of a planar group of nine containers with eight electrodes according to the invention.

FIGS. 2D and 2E show two so-called planar groups 10.

FIG. 2D shows a first planar group 10, which is defined as follows: R=2, Sp=2, N=4, K=5. This comprises a group 10, in which all four empty positions are occupied. This type of group is therefore designated as a complete planar group 10.

In this group 10 according to FIG. 2D, it is possible to manage with only K=4 electrodes if the electrodes are not arranged at the corners but centrally on the outer circumference.

FIG. 2E shows a second complete planar group 10, which is defined as follows: R=3, Sp=3, N=9, K=8. This therefore comprises a group 10, in which all empty positions are occupied.

Numerical values for larger planar groups 10 can be deduced from the following Table 2. Depending on the arrangement of the electrodes on the outer circumference of the group, a difference of one electrode can be obtained in the total number of requisite electrodes. The saving of a further electrode is only achieved, however, in groups having an even number of rows and columns of fully occupied groups 10. This is shown, for example, in the case of a 4-member, 64-member, 96-member, and 348-member group 10.

TABLE 2

Planar groups 10 without empty positions

| Number of containers (N) | Total number of active electrodes 201 | Number of active electrodes 201 per container 5 |
|---|---|---|
| 4 | 4 or 5 | 1 or 1.25 |
| 9 | 8 | 0.88 |
| 12 | 10 | 0.833 |
| 20 | 15 | 0.75 |
| 64 | 40 or 41 | 0.625 or 0.641 |
| 96 | 117 | 1.22 |
| 96 | 58 or 59 | 0.6042 or 0.61458 |
| 99 | 68 | 0.687 |
| 132 | 85 | 0.644 |
| 384 | 212 or 213 | 0.609 or 0.612 |

With reference to Tables 1 and 2 and the exemplary figures, it is obvious that a large number of different permutations is possible. For practical applications, attempts will always be made to keep the number K of requisite electrodes 201 as small as possible, without the entire apparatus forfeiting flexibility. Naturally so many electrodes 201 can be provided that on each container 5 there are four electrodes 201, for example, at a mutual 90-degree angular distance apart. Tables 1 and 2 and the embodiments show, however, that it is possible to manage with significantly fewer electrodes 201. The number of connecting lines 202, required for triggering or tapping signals at active electrodes 201 is thereby also reduced.

Particularly preferred is an embodiment in which the number of electrodes 201 serving as receiver is kept as small as possible since the receivers are more expensive/more complex to implement that the electrodes 201 serving as transmitters.

In all the embodiments, the condition is satisfied in each case that at least two opposite active electrodes 201 are provided per container 5. The electrodes 201 are preferably diametrically opposite one another in each container 5 since in this case, the largest possible symmetry is given. However, other positionings of the electrodes 201 in relation to the respective containers 5 are also possible. Depending on the embodiment, some of the electrodes are shared or used jointly by neighboring containers 5. The electrodes (see, for example, FIG. 16B) are preferably disposed along a zigzag path or a zigzag line 21 (see FIG. 16B).

The term "lie opposite" is used here to express the fact that at least two electrodes 201 in each case are disposed in relation to a container 5 or a working zone for receiving a container 5 in such a manner than an electric field emitted by one of the electrodes 201 passes at least through a part of the container 5 before the electric field is received by an electrode 201 serving as receiver. Preferably the electrodes 201 in all the embodiments are diametrically opposite one another at each container 5.

The invention is based on a (liquid) measurement by means of a capacitively coupled network of electrodes 201. This principle is used in all embodiments. The network can either be designed to be rigid, i.e., hard-wired, partially rigid, i.e. partially hard-wired, or completely flexible or configurable, i.e. not hard-wired. For example, wireless connections (e.g. IR or RF connections) can also be used.

Figure 10:
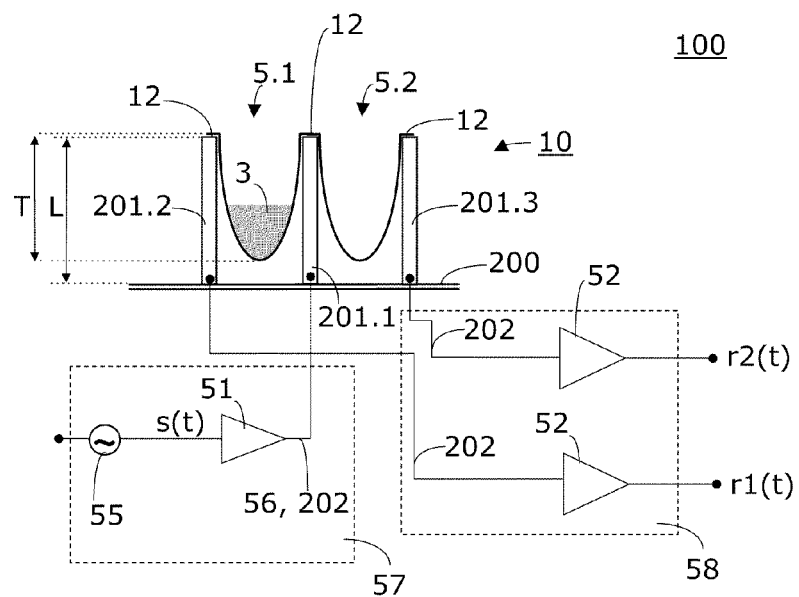
FIG. 10 shows a schematic side view of a base plate with three electrodes and a group of two containers and with electrical wiring according to the invention.

The apparatus 100 according to the invention is specially designed for the detection of liquid 3 in containers 5, as shown schematically in FIG. 10 but can also readily be used for detecting other media. For the purpose of detecting the apparatus 100 comprises a group 10 of containers 5.1, 5.2 to 5.N (N is according to the invention always an integer greater than or equal to 2), which are disposed horizontally at a regular mutual spacing adjacent to one another in rows R and/or columns Sp. The apparatus 100 further comprises a horizontal base plate 200, which is disposed underneath the container 5. In addition, it comprises electrodes 201.1, 201.2 to 201.K (e.g. pillar-like electrodes), which are supported by the base plate 200 or are part of the base plate 200. The electrodes 201 extend from the base plate 200 upward into intermediate spaces 101 between the containers 5 of a group 10. A plurality of electrical connecting lines 202 are provided, through which some of the electrodes can be individually selectively triggered.

According to the invention, at each of the containers 5 in the horizontal plane Eat least two of the electrodes 201.1, 201.2 lie opposite one another, as can be identified, for example in the schematic plan view in FIG. 2A. Due to the individual selective triggering of the active electrodes 201, respectively one of these two electrodes 201.1 serves as transmitter (S) and the other of the two electrodes 201.2 serves as receiver (R), as shown, for example in FIG. 12.

In the case of a microplate (group 10) having 96 containers 5 (called "wells"), a maximum of 96 transmitter/receiver pairs (i.e. a maximum of 192 electrodes 201 in total) are required as electrodes 201. In order to be able to measure a microplate having 96 containers 5, however, 9×13=117 electrodes 201, for example, are also sufficient. Very good measurement results can also be achieved, however, by using (9×13)−6=111 electrodes 201 for such a group 10 having 8×12 containers 5. Table 2 shows that with a group 10 having 8×12 containers 5, it is even possible to manage with only 58 or 59 electrodes 201.

Figure 3:
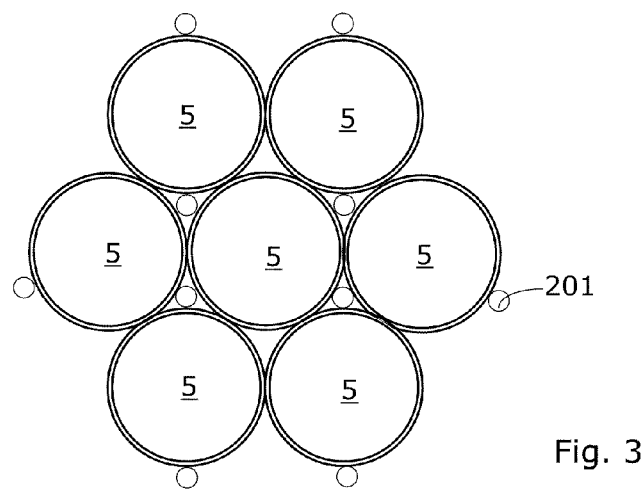
FIG. 3 shows a schematic plan view of a further planar group of seven containers with ten electrodes according to the invention.

FIG. 3 shows a schematic plan view of another planar group of seven containers 5 with ten electrodes 210 according to the invention. Here the individual containers 5 sit on interstices. The electrodes 201 here, for example, have a round cross-section.

The term "pillar-like electrode" is specially used for post- or rod-shaped elements 201. The electrodes can be designated more generally however as protruding or raised electrodes since they extend upward from the base plate 200. The electrodes can, for example, have a conical shape or a truncated cone shape, as can be identified in FIG. 11. The cross-section of the electrodes 201 can have a polygonal shape (e.g. a square shape) or it can be elliptical or circular.

Figure 11:
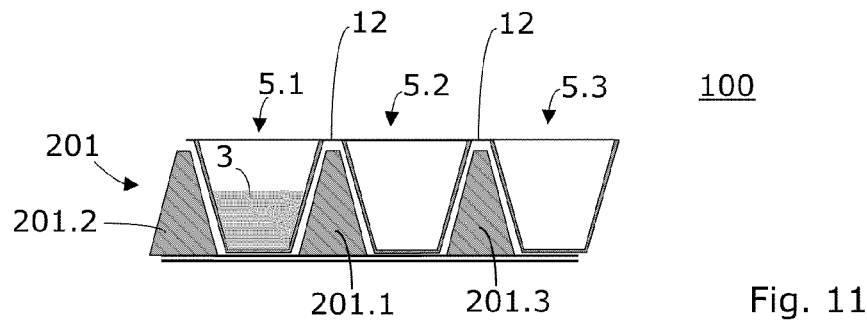
FIG. 11 shows a schematic side view of a base plate with three electrodes and a group of three containers according to the invention.
Figure 12:
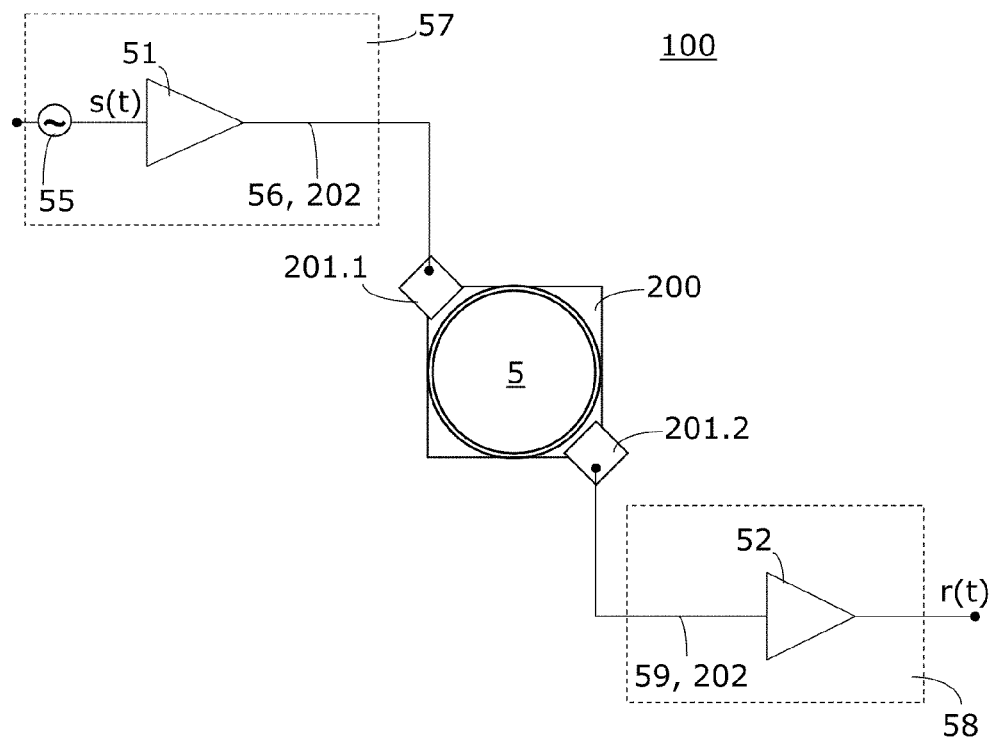
FIG. 12 shows a schematic plan view of a container according to FIG. 2A together with electrical wiring, according to the invention.
Figure 13:
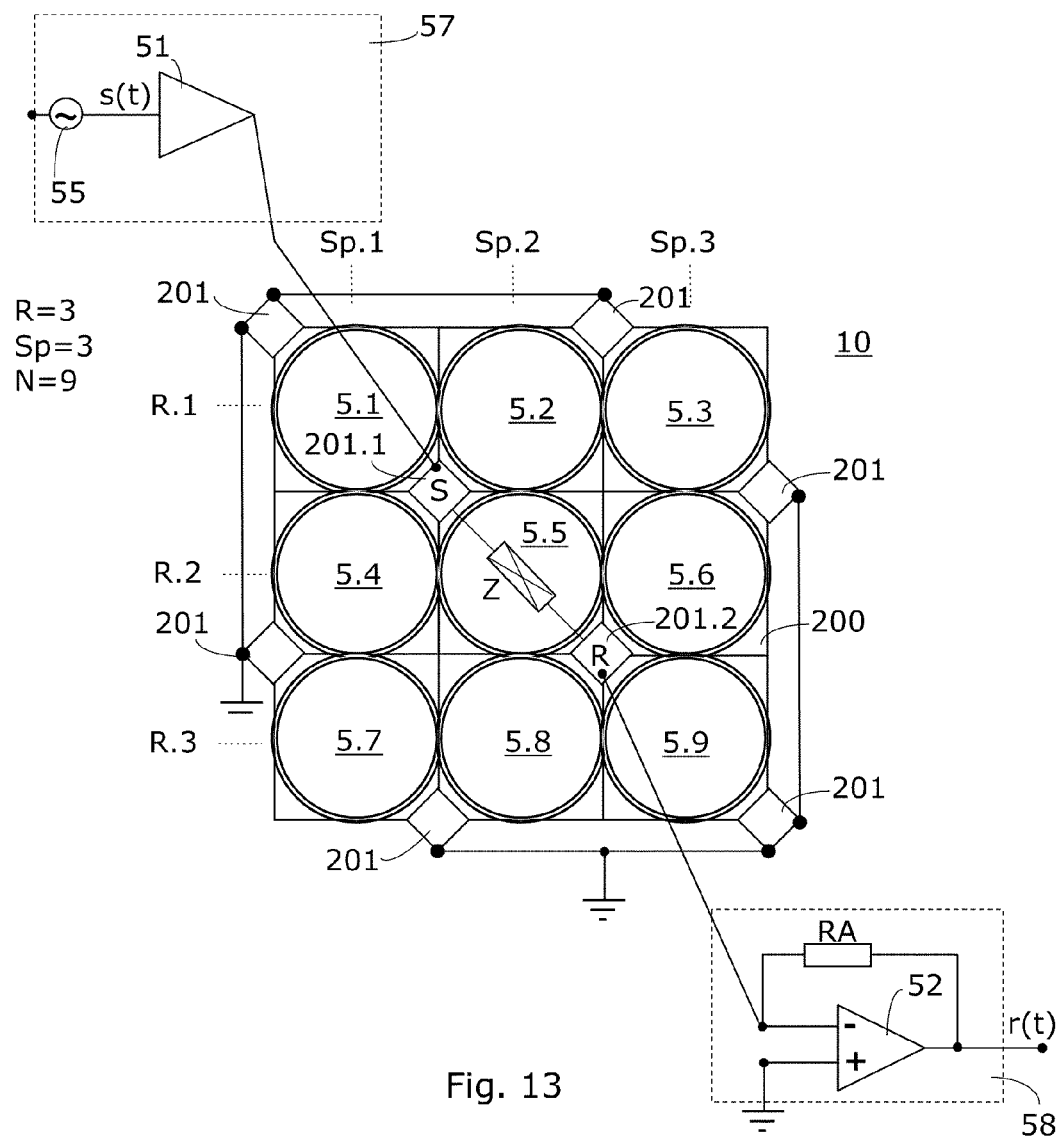
FIG. 13 shows a schematic plan view of a group with eight electrodes, nine containers, and with electrical wiring according to the invention.

Depending on the embodiment or arrangement, either pillar-like electrodes 201 can be inserted in the intermediate spaces 101 (see, for example, FIG. 10) or for example, frustro-conical electrodes 201 can be inserted in the intermediate spaces 101 (see, for example, FIG. 11).

The electrodes 201, whatever shape they have, are designed to be at least partially electrically conducting or coated. FIGS. 4A, 4B, 5A, 5B, 6A, 6C, 7A-7C, 8, 9, 10, 11, 12, 13, 14, 15, 17A, 17B, 18 and FIGS. 19A, 19B and 20-22 show some possible examples of electrodes 201 according to the invention. These electrodes 201 can be used in all embodiments. The electrically conducting part 204 of such an electrode 201 serves as an emitting and/or receiving surface according to the use of the electrode 201 as transmitter (S) or receiver (R).

The electrodes 201 preferably stand perpendicularly to the horizontal base plate 200. However, the electrodes 201 can also be sloping, in order for example to follow the profile of the outer wall of a container 5.

The electrodes 201 preferably have a length L (measured perpendicular to the base plate 200), which approximately corresponds to the depth T of the container 5, as indicated for example in FIG. 10. The length L is preferably somewhat larger that the depth T. FIG. 11 shows electrodes 201, which are somewhat shorter than the depth T.

In particularly preferred embodiments, a microplate comprising the group 10 of containers 5 sits on the top on the upper sides of the electrodes 201. A section of a microplate with two containers 5.1, 5.2 can be identified in FIG. 10, which are interconnected on the upper side, e.g. by webs 12, connections, or surfaces. In the area of these webs 12, connections, or surfaces, the microplate rests on the electrodes 201.

Figure 4A:
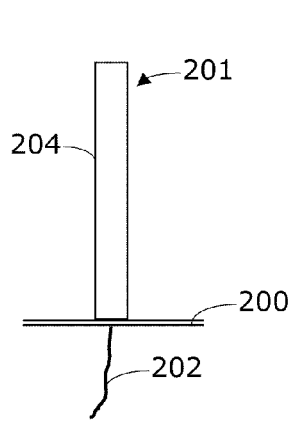
FIG. 4A shows a schematic side view of a first electrode according to the invention.
Figure 4B:
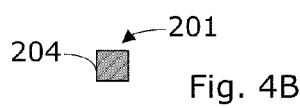
FIG. 4B shows a schematic sectional view of the first electrode according to FIG. 4A.

FIG. 4A shows schematic details of a pillar-like electrode 201 in a side view. An electrical connecting line 202 in the form of a cable is shown below the base plate 200 here. FIG. 4B shows a cross-section (parallel to the horizontal base plate 200) through the pillar-like electrode 201 from FIG. 4A. The pillar-like electrode 201 here has a square cross-section.

Figure 5A:
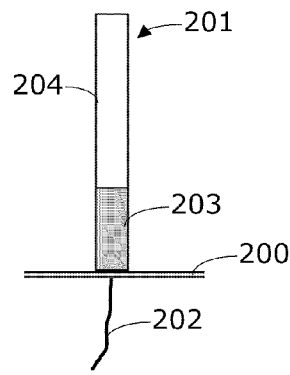
FIG. 5A shows a schematic side view of a second electrode according to the invention.
Figure 5B:
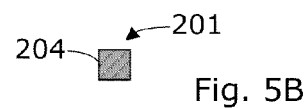
FIG. 5B shows a schematic sectional view of the second electrode according to FIG. 5A.

FIG. 5A shows schematic details of a pillar-like electrode 201 in a side view. Here only the upper region of the electrode 20 is designed as conducting region 204. An electrical connecting line 202 in the form of a cable is shown below the base plate 200. FIG. 5B shows a cross-section (parallel to the horizontal base plate 200) through the conducting region 204 of the pillar-like electrode 201 from FIG. 5A. The conducting region 204 is configured to be solid here, as in FIG. 4B. The pillar-like electrode 201 has a square cross-section here. Instead of electrical connecting lines 202, for example, wireless connections (e.g. IR or RF connections) can also be used.

Figure 6A:
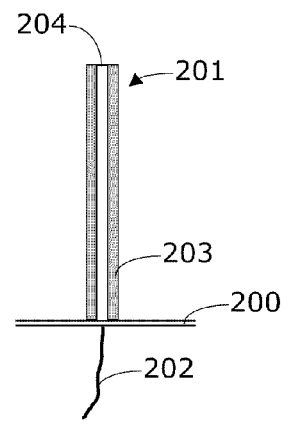
FIG. 6A shows a schematic side view of a third electrode according to the invention.
Figure 6B:
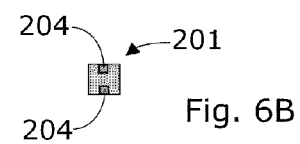
FIG. 6B shows a schematic sectional view of the third electrode according to FIG. 6A.

FIG. 6A shows schematic details of a pillar-like electrode 201 in a side view. Here only two (or more) strip-shaped regions of the electrode 201 are designed as conducting regions 204. An electrical connecting line 202 in the form of a cable is shown underneath the base plate 200. FIG. 6B shows a cross-section (parallel to the horizontal base plate 200) through the pillar-like electrode 201 from FIG. 6A. The conducting regions 204 here are let into the pillar-like electrode 201. The pillar-like electrode 201 here has an overall square cross-section.

In all the embodiments, the conducting regions 204 can however also be designed in the form of a metalized layer (e.g. vapor-deposited or sputtered-on as an external layer).

Figure 7A:
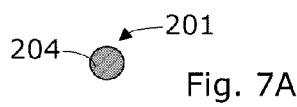
FIG. 7A shows a schematic sectional view of a further electrode.
Figure 7B:
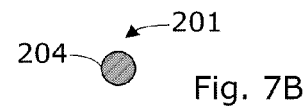
FIG. 7B shows a schematic sectional view of a further electrode.
Figure 7C:
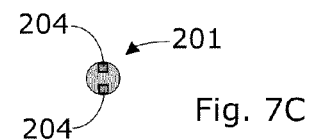
FIG. 7C shows a schematic sectional view of a further electrode.

FIGS. 7A to 7C shows the cross-sections of similar electrodes 201, the cross-sections being round in each case. In connection with FIG. 7A, reference is made to the description of FIGS. 4A, 4B. In connection with FIG. 7B, reference is made to the description of FIGS. 5A, 5B.
In connection with FIG. 7C, reference is made to the description of FIGS. 6A, 6B.

Figure 9:
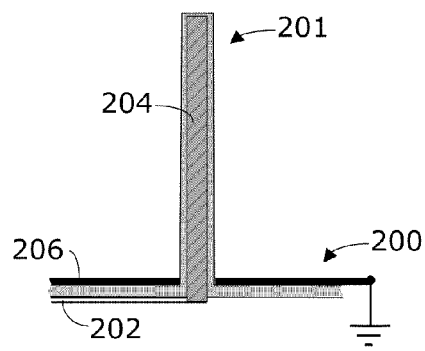
FIG. 9 shows a schematic sectional view through a base plate with integrated electrode, according to the invention.

The electrodes 201 can be an integral component of the base plate 200, as indicated for example in FIG. 9. FIG. 9 shows a schematic sectional view. The base plate 200 together with the post or with a truncated cone according to FIG. 11 is molded, for example, from a plastic material. An electrically conducting core can be provided in the interior of the post or the truncated cone, this core serving as conducting region 204 of the electrode 201. The electrically conducting core extends here as far as the rear side (underside) of the base plate 200 and is there connected to an electrical conducting line 202 in the form of a conductor path. The electrically conducting core is quasi-encapsulated here. This encapsulation helps to prevent short circuits when handled inappropriately. For example, no short circuits of the sensitive transmitter S or receiver R occur even when a conductive liquid 3 should accidentally wet several posts or if contact between two posts is accidentally made with a metal object.

In other embodiments not shown here, the posts are in turn an integral component of the base plate 200. In this case, however, the conducting regions 204 are applied to the surface of the posts (e.g. vapor-deposited or sputtered-on). This embodiment can also be applied to electrodes according to FIG. 11.

Figure 8:
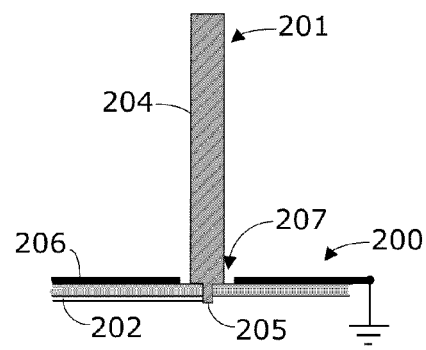
FIG. 8 shows a schematic sectional view through a further electrode together with base plate, according to the invention.

The electrodes 201 can, however, also be fabricated as individual components and connected to the base plate 200, as shown in FIG. 8, for example. The electrodes 201 are preferably screwed and/or soldered to the base plate 200. A connection to the electrical connecting line 202 can, for example, also be made by the soldering.

The electrical connecting line 202 can also be integrated in the base plate 200 or disposed in the form of conductor paths on the upper or lower side of the base plate 200.

The base plate 200 can be fabricated from a nonconducting material and provided with the electrically conducting surface 206, as indicated for example in FIG. 8. The base plate 200 can, however, also comprise a metal or consist of a metal.

The base plate 200 is preferably grounded, i.e. it is located at ground potential. In this case, the base plate 200 has an electrically conducting surface 206, which is at ground potential. A section of a corresponding embodiment is shown in FIG. 8. With reference to this schematic sectional view, it can be identified that the electrode 201 has a lower pin 205, which is electrically conducting and which extends through a through-hole 207 in the base plate 200 to its underside. On the underside of the base plate 200, an electrical connecting line 202 is provided in the form of a conductor path, which is connected to the pin 205 in a conducting manner. The electrically conducting surface 206 here has an opening in the area of the through-hole 207 so that no short circuit occurs between the electrode 201 and the electrically conducting surface 206. Such a short circuit should be avoided in active electrodes 201 used as transmitter (S) and/or receiver (R). Passive electrodes on the other hand are intentionally grounded. This type of arrangement is preferred.

Preferably at least at the instant of a (fill level) measurement, all the electrodes 201 not used as active electrodes 201 at that instant are grounded so that only respectively one transmitter electrode S and one receiver electrode R are active. This principle is indicated schematically in FIG. 13. At the instant shown the electrode 201.1 serves as transmitter S and the electrode 201.2 serves as receiver R. All the other electrodes 201 are instantaneously or permanently grounded. In fact, a complex impedance Z is obtained between the two active electrodes 201.1 and 201.2. The complex impedance Z is indicated schematically in FIG. 13. The electrode 201.1 is virtually grounded and is therefore completely or substantially voltage-free.

When considered purely mathematically, the entire group 10 can be described, for example, by a matrix of several complex impedance values. In each measurement which is carried out in each case between an electrode pair comprising transmitter S and receiver R, a matrix with different complex impedance values is obtained. The different complex impedance values are obtained in each measurements by the interaction of the container 5.5 or the degree of filling (see snapshot in FIG. 13), measured in the present case, with the other containers 5.1, 5.2, 5.3, 5.4, 5.6, 5.7, 5.8, and 5.9 and electrodes 201.

Figure 14:
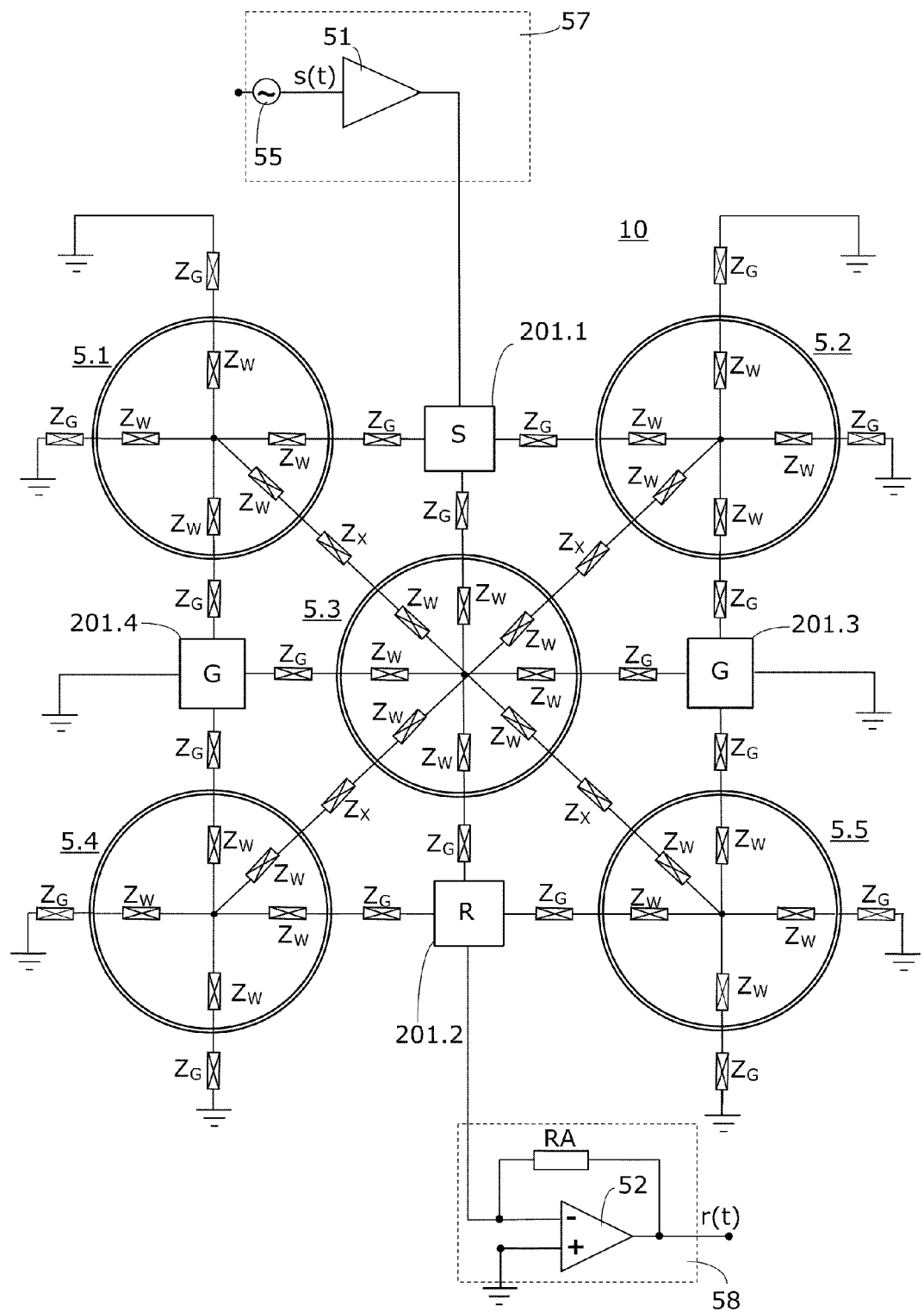
FIG. 14 shows a schematic equivalent circuit diagram of a group with four electrodes, five containers, and with electrical wiring according to the invention.

FIG. 14 shows a corresponding network of complex impedances. The following impedance model is used here for the electrode arrangement. Between the containers 5.N and the electrodes 201.K are the complex impedances, which are here also designated as coupling impedances. For the purpose of simplification, the complex impedances in FIG. 14 are combined as discrete impedance elements (crossed resistance symbols). Located inside the containers 5.N are the container impedances $Z_W$, each composed of a container capacitance $C_W$ and a container resistance $R_W$. In order to be able to distinguish eight directions in the horizontal plane E (plane of the drawing), the distributed total impedance of each container 5.N is divided into eight partial impedances, which lead to a common node at the center of the rotationally symmetric containers 5.N. In the case of poorly conducting liquids 3 or media in the containers 5.N, the parallel resistances (container resistance $R_W$) can be neglected. Between each container 5.N (here the container 5.3) and its four neighboring electrodes 201 (here the electrodes 201.1, 201.2, 201.3, 201.4) there appear four ground impedances $Z_G$, each substantially consisting of a capacitance $C_G$. Between neighboring containers 5.N (here, for example, between the container 5.3 and 5.1), there is respectively one direct crosstalk impedance $Z_X$, which can be represented as capacitance $C_X$.

The current impedances Z, or the capacitances C, are determined in each case between an electrode 201 serving instantaneously as transmitter S (here the electrode 201.1) and the opposing receiving electrode 201 (here the electrode 201.2).

With reference to the diagram in FIG. 14, it can be seen that the network of impedances Z exhibits a significant geometric and circuitry symmetry. As a result of the symmetry, crosstalk influences are partially superposed so that they compensate for each other, preferably completely cancel out or that the crosstalk influences can be mathematically determined more easily.

This makes the mathematical calculations and the use of corresponding algorithms for the computational "fadeout" (in the sense of compensation) of the crosstalk simpler.

The respective geometric arrangement and wiring of the individual electrodes 201 can be selected so that the crosstalk is already completely or largely reduced or eliminated by field superposition as a result of the arrangement and wiring. This statement applies at least for containers 5 located in the inner region of a group 10. Peripheral containers 5 have a slightly asymmetric environment, which has the consequence that the crosstalk occurs more significantly here.

Investigations and simulations have revealed that the crosstalk can be reduced to a few percent by grounding passive electrodes 201. Depending on the group 10, up to 50% of all electrodes 201 can be permanently or temporarily grounded. That is, only about 50% of the electrodes 201 need be designed as active electrodes 201. The circuitry expenditure is thereby reduced appreciably.

The base plate 200 can be a continuous plate, the size of which approximately corresponds to the surface extension of the group 10 or the grid of the group 10. The base plate 200 can, however, also be composed of a plurality of elements, e.g. individual strips. The base plate 200 is preferably designed so that it acts as electrical grounding or shielding. Such grounding or shielding can also be achieved if the base plate 200 is not one-piece.

Preferably passive or active driven shieldings are used in all embodiments. The shieldings are not shown here.

It has already been mentioned that there are active and passive electrodes 201. The passive electrodes 201 are permanently or temporarily grounded or they are located at a different predefined voltage potential. The active electrodes 201 are either used only as transmitters or only as receivers or temporarily as transmitters and temporarily as receivers. Depending on the embodiment, the active electrodes 201 can temporarily also be grounded. The active electrodes 201 are characterized in that they can be excited individually or jointly by the transmitting circuit 57 and/or they can be read out individually or jointly by the receiving circuit 58. Each active transmitter electrode 201 has a connecting line 202 so that they can be connected at least temporarily to the output 56 of a transmitter circuit 57 (see, for example, FIG. 10). Each active receiver electrode 201 has a connecting line 202 so that they can be connected at least temporarily to the input 59 of a receiving circuit 58. The circuit principle is shown in schematic form in FIG. 12. A transmission amplifier 51 is used as part of a transmitting circuit 57 in order to amplify an input signal s(t) of a generator 55 and apply it to a transmitter electrode 201.1. At this instant the diametrically opposite electrode 201.2 serves as receiver electrode and for this purpose is connected to a receiving amplifier 52. The receiving amplifier 52 provides an output signal r(t), which allows a statement about the quantity of liquid or the quantity of the medium which is located instantaneously in the container 5 between the two electrodes 201.1, 201.2.

According to the invention, preferred embodiments are designed so that the receiver electrodes 201 or those electrodes 201, which serve temporarily as receiver electrodes 201, are virtually grounded. As a result, the capacitive crosstalk between neighboring electrodes is completely or almost set to zero. There remains only a small signal fraction, which is obtained from crosstalk from container 5 to container 5 (well-to-well).

Preferably some of the electrodes 201 are permanently or temporarily grounded, as mentioned. A significant reduction of the crosstalk can thereby be achieved. The crosstalk can be minimized or even completely set to zero by means of a precalculated geometric dimensioning (such as size, spacing, alignment etc.) and/or wiring of the electrodes 201. This form of optimization/minimization is possible since the groups 10 comprise groups 10 having regularly arranged containers 5 and also electrodes 201, whose mutual spacings, geometric shapes, electrical conductivity, and other properties are known.

Depending on the situation, neighboring containers 5 can also make a negative contribution to the crosstalk. For example, a directly neighboring container 5.1, which is filled with liquid 3, can produce a negative crosstalk on the container 5.2 presently to be measured (see, for example, FIG. 10).

FIG. 10 shows a section through a part of an apparatus 100. Two directly adjacent containers 5.1 and 5.2 can be identified in this schematic sectional view. One electrode 201.1 sits centrally between the two containers 5.1 and 5.2. A further electrode 201.2 sits to the left and another electrode 201.3 sits to the right. In the example shown, the central electrode 201.1 is user as transmitter electrode, which can be excited, for example, by a transmission amplifier 51 having an input signal s(t). At the instant shown here, the two electrodes 201.2 and 201.3 serve as receiver electrodes. The receiver electrode 201.2 receives a signal r1(*t*), which differs from the signal r2(*t*) received by the receiver electrode 201.3. The differences between the two signals r1(*t*) and r2(*t*) are obtained from the different fill level situation. In container 5.1 there is a small quantity of liquid 3 or another medium. The container 5.2 on the other hand is empty. If both containers 5.1 and 5.2 were filled equally with the same liquid or the same medium, the two signals r1(*t*) and r2(*t*) would be identical as a result of the symmetry.

The electrode arrangement of the apparatus 100 can either be operated with the aid of clocked electrical signals (so-called clocked operation) or with the aid of sinusoidal signals (so-called linear or analog operation). The receiver electrodes 201 receive and provide an electrical signal r(t), which here preferably comprises a current if one of the receiving circuits 58 shown in the figures is used. The current intensity is a measure for the instantaneously measured capacitance (here designated as complex impedance $Z_{tot}$) and therefore the fill level in the container 5. During linear operation, advantageously no harmonics occur and consequently no undesirable interferences can be produced. Furthermore, narrow-band filters (not shown) can be used in the receiving circuit 58 for the signal processing. This leads to an improvement of the signal-to-noise ratio and the sensitivity of the apparatus 100 or the electrode arrangement in a simple manner. Significantly smaller changes of the capacitance of the electrode arrangement can thus be determined or measured.

The present invention relates in particular to apparatus 100 for measurement of the fill level, which is operated with sinusoidal signals in the linear mode.

A periodic input signal s(t) is preferably used in the various embodiments. Particularly preferred is a sinusoidal signal s(t) having a frequency between 100 kHz and 5 MHz. The transmission circuit 57 comprises a generator. If a sinusoidal signal s(t) is used, a sine generator 55 is used as part of the transmission circuit 57. Such a sine generator 55 is shown, for example, in FIGS. 10, 11, and 13.

The electrode 201 serving as transmitter S is not grounded at the measurement time but is connected to a signal voltage source (i.e. to the output of the corresponding transmitter amplifier). The electrode 201 serving as receiver R on the other hand is placed at virtual ground.

Figure 15:
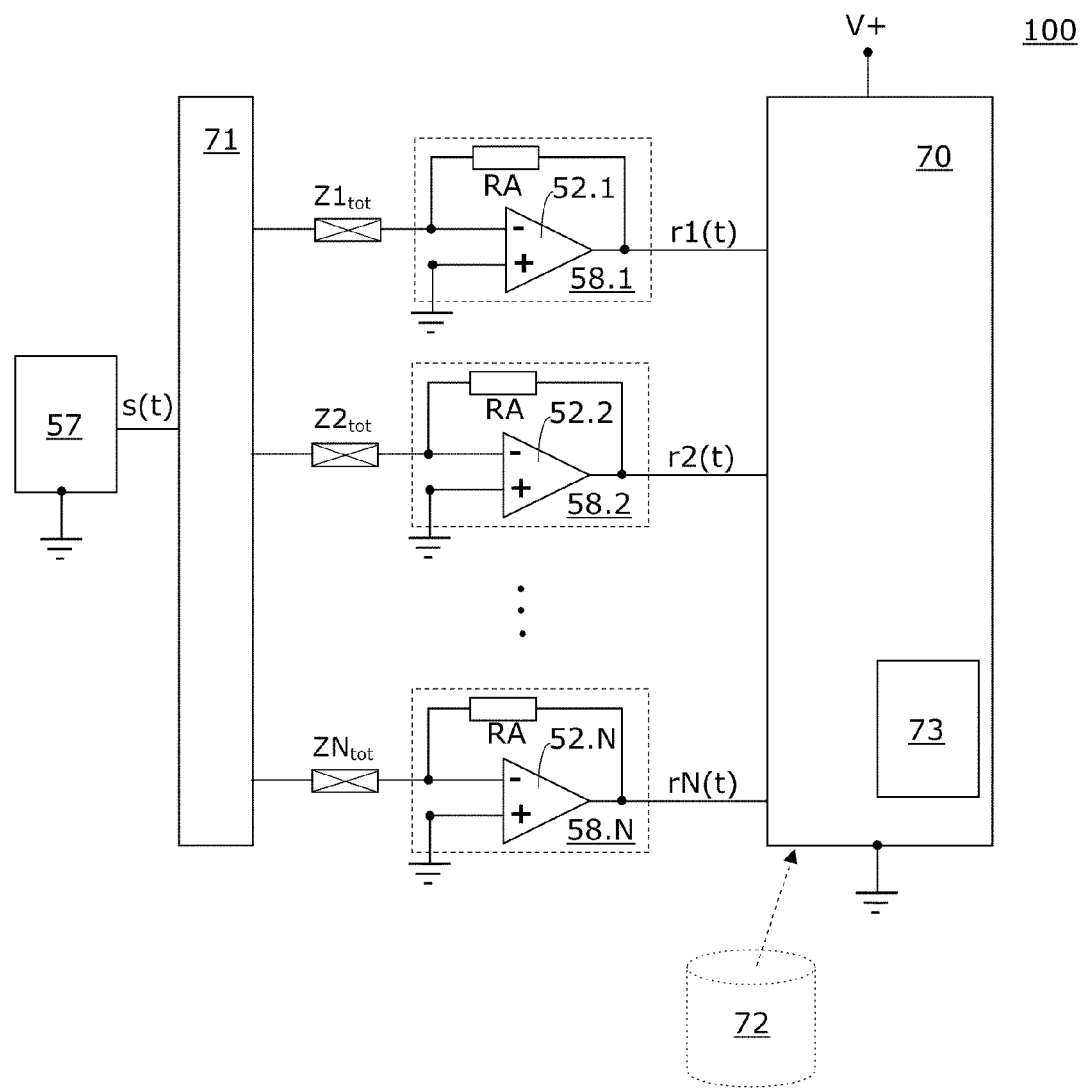
FIG. 15 shows a schematic equivalent circuit diagram of a preferred embodiment according to the invention.

FIG. 15 shows a preferred embodiment of the wiring of the electrode arrangement of the apparatus 100. In this embodiment a single transmission circuit 57 is used, which transmits a (sinusoidal) input signal s(t) to a multiplexer 71. The multiplexer 71 has a total of N outputs and switches the input signal s(t) step by step to each of the N outputs. If N containers 5.1 to 5.N are to be measured, the input signal s(t) is thus successively applied to each electrode 201 serving as transmitter S. The individual complex impedances, which characterize each measurement channel 1 to N individually, are each shown in FIG. 15 by only one impedance symbol having reference numbers $Z1_{tot}$ to $ZN_{tot}$. In this embodiment, one receiving circuit 58.1 to 58.N is used per channel. Each of the receiving circuits 58.1 to 58.N delivers an output signal r1(*t*) to rN(t), which allows a statement to be made about the instantaneously measured impedance $Z1_{tot}$ to $ZN_{tot}$. On the output side, there is provided a central evaluation module 70, which processes the output signals r1(*t*) to rN(t). All the active transmitter electrodes (not shown in FIG. 15) are or will be connected to a signal voltage source (i.e. to the output of the corresponding transmitter amplifier) at the given time. The wiring according to FIG. 15 can be applied to all embodiments.

The network module according to FIG. 14 can be used, for example to determine the individual complex impedances $Z1_{tot}$ to $ZN_{tot}$. The number of impedances $Z_G$, $Z_W$, $Z_X$ (from parasitic capacitances and resistances) to be taken into account in forming the network model depends on how accurate the model is to be. in FIG. 14 only the directly adjacent elements were included since the effect or the influence of other elements is severely reduced with increasing spacing. Naturally, more than only the directly adjacent elements can also be included.

Crosstalk impedances (crosstalk capacitances) between receiver electrodes 201 arranged spatially far apart are usually small compared to the remaining impedances of the model and can therefore frequently be neglected. Usually, it is sufficient to take into account in the (mathematical) model the crosstalk impedances to the next, when viewed spatially (as in FIG. 14), and to the next but one receiver electrode.

The parasitic capacitances have the following influences which have a negative effect on the measurement results. The parallel capacitances together with the relevant capacitance between transmitter S and receiver R each form a voltage divider, which leads to a reduction of the current flowing into the receiver electrode R and via the current-voltage converter 58 leads to a reduced output signal r(t) and therefore to a reduction of the signal-to-noise ratio and the measurement accuracy. The crosstalk capacitances Cx represent couplings between neighboring containers 5.N. The currents emanating from the transmitter electrodes therefore not only reach the receiver electrode via the container to be measured but also via neighboring containers, which leads to undesirable influencing of the output signal r(t) by these neighboring containers. Since the capacitances Cx depend on the fill level of neighboring containers, the received current is not only dependent on the fill level of the container to be measured but also on the fill level of neighboring containers, which is designated as crosstalk and results in a spatial loss of resolution of the apparatus 100.

Since the geometric arrangement of the individual elements (electrodes 201 and containers 5) according to the invention is precisely known, the impedance values of the model presented in FIG. 14 can be calculated with the aid of the finite element method (FEM). If the model with the impedance values and the structure of the receiving circuits 58.1-58.N are known, the signals r1(*t*) to rN(t) prepared by the receiving circuits 58.1-58.N can be calculated either analytically or with the aid of a circuit simulator. This analytic determination or calculation can be made in the evaluation module 70. Preferably at least some of these determinations or calculations will be executed by means of software.

Preferably the signals r1(*t*) to rN(t) (pre-) processed by various receiving circuits 58.1-58.N are compared with one another by the evaluation module 70.

Depending on the embodiment, a reference sensor can be provided in addition to the electrode pair serving as measurement sensor in order to be able to blank out, for example, environmental disturbance variables (temperature, air humidity, pressure), for example, by difference formation. The transmitter-side signal generator 55 in this case supplies both the transmitter of the instantaneously active electrode pair and also the transmitter of the reference sensor. This approach can be applied to all embodiments.

The output signals r(t) of the receiving circuits 58 are further processed, for example, by an evaluation module 70 according to FIG. 15.

Preferably the transmitters in all the embodiments operate at a frequency below the Maxwell frequency.

The apparatus 100 according to the invention is extremely sensitive, which enables it to carry out highly accurate fill level measurements. In order to prevent any impairment of the measurements, preferably in all embodiments electrically conducting elements (e.g. pipetting needles) are removed from the region of the containers 5 before performing a fill level measurement.

The apparatus 100 according to the invention in all embodiments is preferably provided with an evaluation module 70, which uses algorithms to minimize influences of neighboring containers 5. Preferably so-called "clusters" (in the sense of subgroups) are formed in this case in order to be able to "blank out" all undesired influences depending on the measurement situation and state.

As a result of the arrangement of the containers 5 and/or electrodes 201, mutually interfering influences (crosstalk) caused by superposition of the electric fields (alternating fields) of neighboring containers are partially cancelled out. In addition, a mathematical compensation by using corresponding algorithms can be used, as described.

The corresponding algorithms enable an intelligent evaluation of the measurement results and/or mathematical compensation for perturbing influences.

In a preferred embodiment, the algorithms are adapted to the respective situation. For this purpose, for example, comparative or calibration values can be read out from an optional memory 72 (see FIG. 15), which can be connected to the evaluation module 70.

It is also possible to characterize the containers 5 of all embodiments by means of a machine-readable coding, to that the apparatus 100 can select a corresponding algorithm (e.g. from a memory 72) on identifying a specific container 5. Depending on the container 5, a different measurement method or triggering scheme can also be used.

For example, a barcode (e.g. a capacitive barcode) RFID (radio frequency identification), or another marking of a group 10 can be used as machine-readable coding.

In a preferred embodiment it is determined before a measurement whether a group 10 has actually been placed, and/or whether the group 10 has been correctly placed, i.e. whether the electrodes 201, for example, sit correctly in the intermediate spaces 101. These steps can be applied to all embodiments.

In a preferred embodiment, a so-called baseline measurement is carried out before a measurement or when calibrating the apparatus 100 to determine the influences of an empty and dry microplate or group 10 of containers 5. The information thus recorded can then be deducted during a measurement. Such a baseline measurement can, for example, exclude influences which may be caused by fairly small deviations from the ideal shape. The results of the baseline measurement can be stored, for example, in an optional memory 72. These steps can be applied to all embodiments.

In all embodiments, the invention makes use of the fact that an empty container 5 has a different capacitance from a liquid-filled container 5. An empty container 5 leads to a lower capacitance between the transmitter electrodes S and the receiver electrodes R, a filled container 5 leads to a higher capacitance.

An amplifier 52 is preferably used as part of the apparatus 100 according to the invention, said amplifier being designed or wired so that current values can be evaluated but the voltage at the amplifier input 52 is zero or almost zero (virtual ground). This can be accomplished, for example, by using a suitably wired operational amplifier 52.

Preferably a lock-in amplifier as part of the circuit 58 is used as part of the apparatus 100 according to the invention in order to evaluate the signals r(t) delivered by receiving electrodes 201. Noise from the connecting lines 202 is not co-amplified by such a lock-in amplifier. The noise is therefore minimal. A lock-in amplifier operated with a sine signal is preferably used.

A synchronous demodulator or lock-in amplifier for amplitude demodulation is preferably used as part of the apparatus 100 according to the invention in order to evaluate signals r(t) delivered by receiver electrodes 201. Phase shifts of the measurement signal can be compensated by such a phase-locked loop.

In order to further process current values delivered by the receiving amplifier/s 52, A/D converters are preferably used in the evaluation module 70. In these cases, the central evaluation module 70 is equipped with an A/D converter, which converts the signal $r1(t)$ to $rN(t)$ into digital values, the entire processing taking place with digital circuits in this case.

Depending on the embodiment, a dedicated receiving amplifier 52 or a dedicated receiving circuit 58 can be provided per receiver electrode 201. In this case, measurements can be made partly in parallel, although particular attention should be paid here to influences which may arise as a result of crosstalk when measurements take place simultaneously. A disadvantage of this approach is that very many receiving amplifiers 52 or receiving circuits 58 must be used.

Instead of this, however, the number of receiving amplifiers 52 or receiving circuits 58 can also be reduced by output-side multiplexing. It is possible to execute all the channels, i.e. all the fill level measurements temporally successively. In this case, only one transmitter circuit 57 and one receiver circuit 58 are used, which are temporarily connected to the transmitter electrodes 201 and receiver electrodes 201 to be activated.

The triggering of the electrode network of electrodes 201 is preferably accomplished via an input-side multiplexer 71, as shown in FIG. 15.

Figure 16A:
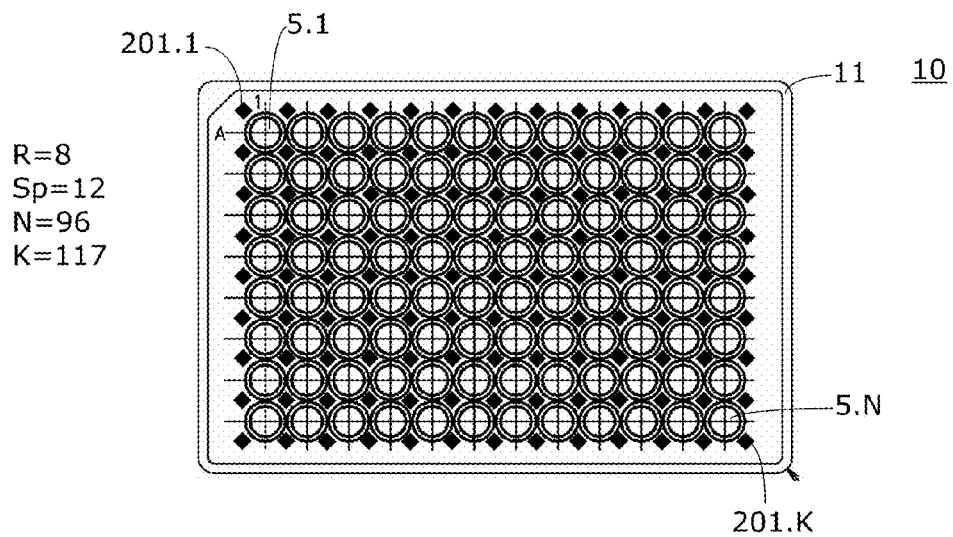
FIG. 16A shows a schematic plan view of a group with 117 electrodes and 8×12 containers, according to the invention.
Figure 16B:
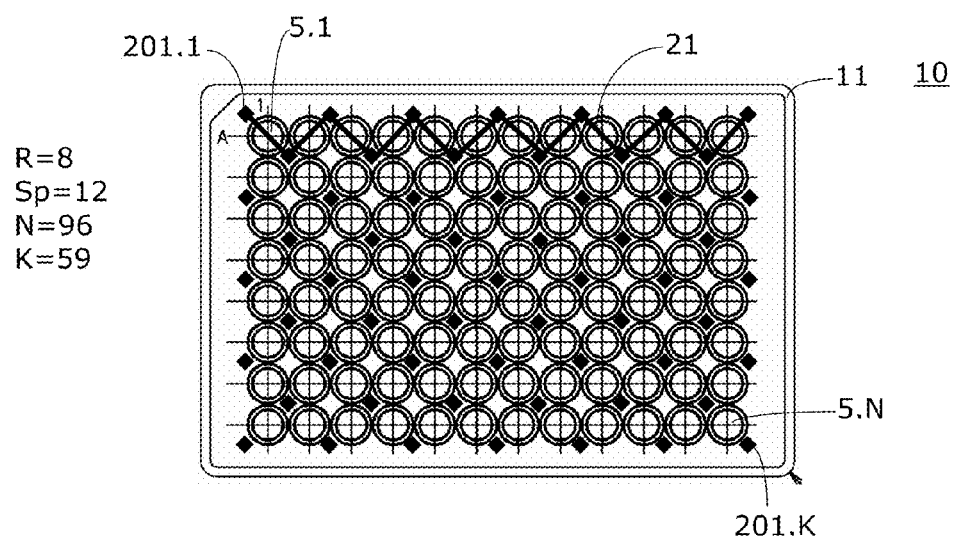
FIG. 16B shows a schematic plan view of a group with 59 electrodes and 8×12 containers, according to the invention.
Figures 17A, 17B:
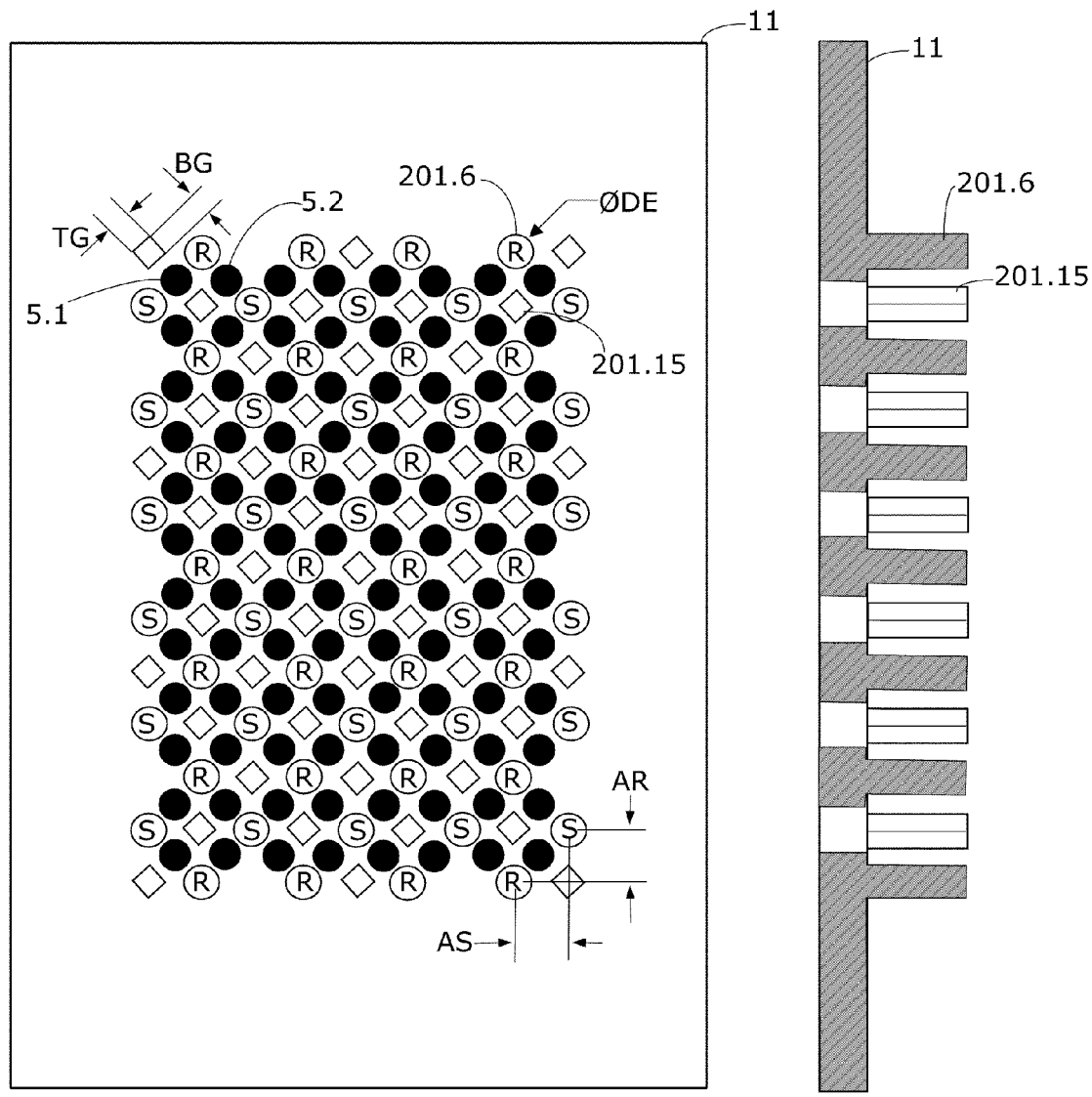
FIG. 17A shows a plan view of a group with 8×12 containers and a base plate with electrodes according to the invention.
FIG. 17B shows a sectional view of the group according to FIG. 17A.

FIG. 16A shows a schematic plan view of a group with 9×13 electrodes 201 and 8×12 containers, according to the invention. FIG. 16B shows a schematic plan view of a group with only 59 electrodes 201 and 8×12 containers, according to the invention. A direct comparison of the two FIGS. 17A and 17B shows that if required, the number of electrodes can be drastically reduced. In this figure a zigzag line 21 is drawn to indicate that the electrodes 201 are preferably disposed along such a zigzag line 21. For a group 10 according to FIG. 16A or 16B, in an optimal arrangement even just 58 electrodes 210 are sufficient (see Table 2).

The group 10 of different embodiments are preferably designed so that they can be inserted or placed from above onto the base plate 200 with electrodes 201.

FIG. 17A shows a schematic plan vie of a group with 58 active electrodes 201 (here shown as white filled circles), 8×12 containers (here shown as black filled circles), and 49 permanently grounded electrodes (here shown as white filled diamonds) according to the invention. FIG. 17B shows a cross-section through this group 10. By reference to this cross-section, it can be seen that here in each case an active electrode (e.g. the electrode 201.6) follows a grounded electrode (e.g. the electrode 201.15). The grounded electrodes have a different cross-section here compared with the active electrodes. The grounded electrodes can, for example, have a square cross-section whereas the active electrodes, for example, have a circular cross-section. According to the other embodiments, the form of the electrodes 201 can also have a different shape. The square cross-section of the grounded electrodes has a width BG and a depth TG where TG=BG. The width BG and the depth TG can be between 1 and 10 is mm. In a grid having a uniform grid structure, the column spacing AS is equal to the row spacing AR. The column spacing AS and the row spacing AR can be between 5 and 20 mm. The diameter of the active electrodes can preferably be between 2 and 10 mm.

In FIG. 17A the transmitters are characterized by an S and the receivers by an R. The transmitting or receiving functions is in each case fixedly allocated to these electrodes, i.e. the wiring or connection can be fixedly designed. Overall there are 28 receivers R and 30 transmitters S here.

The electrodes 201 can, however, also have any other shape as long as they fit in the intermediate spaces 101 (not identified in FIG. 17A).

The transmitters and the receivers can also be divided conversely. Overall there are then 28 transmitters S and 30 receivers R.

Figure 18:
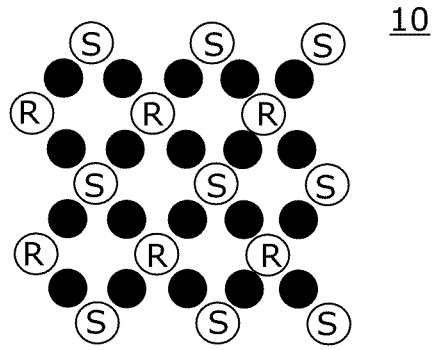
FIG. 18 shows a plan view of a group with 4×5 containers and an arrangement of electrodes according to the invention.

FIG. 18 shows a schematic plan view of a group 10 with 20 active electrodes 201 (here shown as white filled circles) and with 3×4 containers (here shown as black filled circles). No grounded electrodes are provided here. This embodiment has a positive crosstalk but at the same time has a more significant dependence on the signal on the fill level in the containers. In such an embodiment the crosstalk can be largely compensated mathematically (by using suitable algorithms). Series of tests are preferably carried out to obtain calibration values. The calibration values thus determined can then be used for compensation in the "genuine" measurement. This principle can be applied to all embodiments. It is primarily suitable for embodiments which manage without grounded electrodes, as in FIG. 18.

Figure 19:
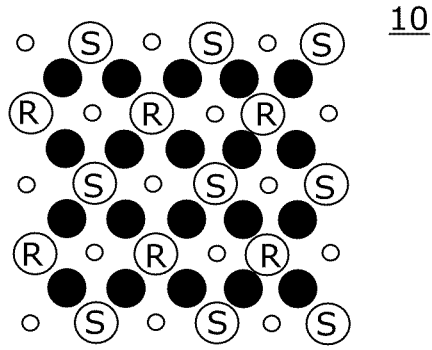
FIG. 19 shows a plan view of a group with 4×5 containers and an arrangement of further electrodes according to the invention.

Since the size and/or shape and/or positioning of the grounded electrodes influences the crosstalk, one can minimize the crosstalk by a suitable choice, dimensioning, and positioning of the grounded electrodes. FIG. 19 shows a schematic plan view of a group 10 with 15 active electrodes 201 (here shown as white filled circles) and with 3×4 containers (here shown as black filled circles). The grounded electrodes are shown by small white filled circles. The diameter of the grounded electrodes was determined here so that the crosstalk is minimal. A disadvantage of this arrangement however is that the useful signal r(t) is smaller than that in the arrangement according to FIG. 18.

Figure 20:
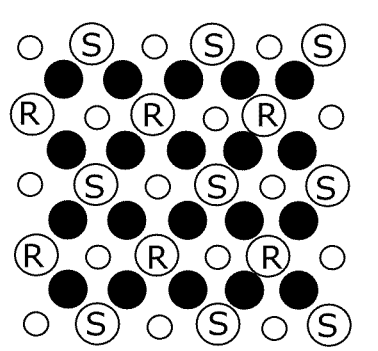
FIG. 20 shows a plan view of a group with 4×5 containers and an arrangement of further electrodes according to the invention.

FIG. 20 shows a schematic plan view of a group 10 with 15 active electrodes 201 (here shown as white filled circles) and with 3×4 containers (here shown as black filled circles). The grounded electrodes are shown by somewhat larger white filled circles. The diameter of the grounded electrodes here is larger than in FIG. 19. As a result, the crosstalk is negative. A disadvantage of this arrangement however is that the useful signal r(t) is smaller than that in the arrangement according to FIG. 19.

In a further preferred embodiment, two planes are used, which can be arranged underneath the base plate 200 or integrated in the base plate 200. One of these planes can comprise the conductor paths 202 for connecting the electrodes 201 to the transmitting circuit 57 or receiving circuit 58 while electronic components, amplifiers, processors (e.g. of the evaluation module 70), and a voltage supply are provided on a second plane. In this case, it is possible to supply one assembly with base plate 200 and the said planes, which comprises all the elements of the apparatus 100 required to determine the fill level. In this case, only one interface is provided to transmit results of the fill level determination to another assembly or another module of a device. This principle can be applied to all embodiments.

In a further preferred embodiment, a reference structure is used to be able to "blank out" environmental influences, the properties of which are known precisely. The reference structure preferably comprises a reference electrode pair in order to be able to determine, for example, the current air humidity and subtract it. Ageing effects and temperature drift, for example, can be compensated by such a reference structure.

In the various embodiments, the form of the permanently grounded electrodes can be selected so that the crosstalk is reduced as far as possible.

In the various embodiments, a measurement inversion can be used at each electrode pair to be able to identify and/or eliminate asymmetries. In the measurement inversion method in a first step a first electrode 201.1 is used as transmitter S and a second diametrically opposite electrode 201.2 is used as receiver R. After an input signal s(t) has been applied to the first electrode 201.1 and the signal r(t) has been tapped at the second electrode 201.1, in a second step the wiring is reversed and the input signal s(t) is applied to the second electrode 201.2. During the second step the signal r(t) is then tapped at the first electrode 201.2. By means of a superposition or by means of a difference formation, asymmetries can be identified and/or eliminated.

In all embodiments, a parallel capacitance can be disposed parallel to the resistance RA, which connects the negative input of the amplifier 52 to the output of the amplifier 52. The parallel capacitance is used to compensate for frequency response and avoid oscillation. The resistance RA (without or without parallel capacitance) form a feedback or negative feedback.

In all embodiments the amplifier 52 is preferably designed as an inverting amplifier, as shown in the drawings. In this case, the inverting inputs (i.e. the inputs designated with a minus sign) of the amplifier 52 form virtual grounds.

If a plurality of neighboring containers 5 are to be measured simultaneously, it is advantageous to use signals of different frequencies for the two measurements so that on the receiver side the contributions of the two signals can be determined separately by means of filtering or synchronous demodulation, or by means of both measures, and the crosstalk is minimized. Instead of different frequencies, the same frequencies with different phase positions can be used or modulation methods can be used, which enable a separation of the two signal contributions. These approaches can be applied to all embodiments.

A preferred apparatus 100 is designed for the individual measurement of the fill level of media in two or more substantially upright containers 5. This apparatus 100 comprises electrodes 201, which are disposed outside the at least one container 5. The apparatus 100 is configured especially for measurement of the fill level in a plurality of containers 5 which are arranged or can be positioned in groups. This comprises a substantially horizontally disposed base plate 200 and a plurality of uniformly arranged electrodes 201, which stand substantially upright to a horizontal plane E defined by the base plate 200 and which are each arranged at a distance from one another so that respectively one working zone for receiving respectively one container 5 of the group 10 is obtained between respectively two electrodes 201. A part of these electrodes 201 is configured and/or wired so that they can be triggered as transmitter element and a part of these electrodes 201 is configured and/or wired so that they can be triggered as receiver element. Each of the containers 5 can be introduced or disposed in a working zone between respectively two electrodes 201. Electrical connecting lines 202 are provided for triggering electrodes 201 selected as transmitter element and/or for reading out electrodes selected as receiver element. A triggering module (e.g. with a transmitting circuit 57) is designed to excite the electrodes 201 serving as transmitter elements S with a signal s(t) via the connecting lines 202. An evaluation module (e.g. the module 70) is designed to receive and evaluate signals r(t) from the electrodes 201 serving as receiver element R via the connecting lines 202.

Preferably on the receiver side, e.g. as part of the evaluation module 70, a crosstalk module 73 (see FIG. 15) is used for the computational elimination of the crosstalk. The corresponding module 73 is based on an algorithmic compensation or elimination of the crosstalk. The crosstalk is preferably suppressed computationally by the crosstalk module 73 by means of an algorithm, the algorithm including stored reference values of a reference measurement. These reference values can, for example, be obtained from the optional memory 72 (see FIG. 15).

The invention can be applied to laboratory plates, microplates, stripracks, tube rows (e.g. a strip-shaped arrangement of containers 5 according to FIG. 2B or 2C), and other initially specified groups 10. Depending on the shape of the container 5, inaccuracies can occur during the measurement in the case of small fill quantities.

In a particularly preferred embodiment, the base plate 200 together with the electrodes 201 is not only used for the capacitive measurement of the fill levels as described but also as holders for individual small tubes or tubes (container 5) which are to be measured. This "holding function" can be applied to all embodiments, whose groups 10 are composed of individual containers 5.

In all embodiments of the invention, the electrodes 201 are independent of the containers 5. That is, they are neither firmly secured to the containers nor are they, for example, integrated in the containers 5.

A common, large-area antenna or electrode plate is not provided in any embodiment of the invention but the invention uses individual, at least partially individually triggerable electrodes 201 on a common base plate 20.

Groups having containers 5 which have a V-shaped base or round base are particularly well suited.

The invention can also be applied to so-called "deepwells", in which the ratio of the diameter of the container 5 to the depth T of the container 5 is very small.

The shape of the container 5 can be taken into account during the evaluation, e.g. by the evaluation module 70 so that the properties of determined output signals r(t) can be better classified or assigned. For this purpose, a machine-readable coding of the groups 10, as mentioned, can be appropriate.

As a result of the fact that electrodes 201 need not necessarily be positioned at all positions, the invention can also advantageously be applied to plates, which have certain asymmetries in the form of webs or the like. Such asymmetries can, if required, be subtracted out in a computational manner or even completely compensated. A prerequisite for this however is that the apparatus 100 precisely recognizes the type of group 10 to be measured in the present case. The coding can also provide corresponding information here.

The more accurately the properties of the liquids 3 or media which are to be measured are known, the more accurately the fill level measurement can be made. For this purpose, the apparatus can have means for the manual or automatic adjustment of presetting of corresponding values.

The invention has the advantage that an entire group 10 (e.g. a microplate) having a large number N of containers 5 can be measured in a few hundred milliseconds. Previous solutions working on an ultrasound basis, for example, typically require several minutes for this.

The invention has the advantage that it works in a noncontact manner and free from contamination since no sensors, needles, or the like dip into the liquids 3 or media in the containers 5.

It is a further advantage of the invention that the costs for the apparatus 100 are comparatively low.

The invention not only makes it possible to evaluate the correct aspiration and/or dispensing by means of a concomitant (simultaneous) fill level measurement but also makes it possible to determine an absolute quantity of liquid.

Since the elements of the apparatus 100 are disposed below the group 10, the space above the group 10 is completely available for other assemblies and components.

The apparatus 100 according to the invention or the method according to the invention can be used in various equipment and apparatus. It is obvious that certain adaptations are required depending on the environment.

The invention allows a fill level measurement in each individual container 5 of a group 10, i.e. individual measurements are possible.

The invention also enables real-time monitoring of the fill levels in the individual containers 5.

The invention provides a resolution of about 1 µl in liquids, which is significantly better than that in previously known solutions. In the case of real capacitance variations, for example in pipetting applications, these capacitance variations can lie in the range of a few femtofarad. The apparatus 100 is capable of reliably measuring such small variations despite the direct proximity and the spatially closely packed arrangement of all the elements.

The invention can be used particularly advantageously in the monitoring of an elution/solid-phase extraction, in which a filter can possibly burst or become blocked. By detecting or observing the fill levels, it can be monitored whether the extraction is proceeding as desired. By observing the fill levels with an apparatus 100 according to the invention, it can be monitored, for example, whether a filter is blocked since in this case only a small amount or no liquid 3 arrives in the container 5. If a filter bursts, this can be determined by the apparatus 100 since the amount of liquid in the container 5 increases abruptly.

In a further preferred embodiment, the fill level detection which is carried out by means of rear-side electrodes 201, is supplemented by delivering and dipping a conductive needle. When this needle reaches the liquid level of a liquid 3 in a container 5, this then results in a field disturbance which may be clearly measured. Such a combination can be used if required to obtain further statements, which are possibly not available in any other way.

REFERENCE LIST

Sensor arrangement 1
Signal source 2
Liquid 3
Container 5, 5.1, 5.2-5.N
Peripheral liquid container 6
Groups 10
(Micro)plate 11
Webs 12
Basic module 20
Zigzag line 21
Transmitter 51
Receiver 52; 52.1 to 52.N
Effective transmitter 53
Effective receiver 54
(Sine) generator 55
Output 56
Transmitting circuit 57
Receiving circuit 58; 58.1-58.N
Means for capacitive liquid detection 60

Evaluation module 70
Multiplexer 71
Memory 72
Crosstalk module 73
Apparatus 100
Intermediate spaces 101
Horizontal base plate 200
Pillar-like electrodes 201; 201.1, 201.2
Electrical connecting line 202
Nonconducting region 203
Conducting region 204
Tap 205
Electrically conducting surface 206
Through-hole 207
Laboratory equipment 400
Row spacing AR
Column spacing AS
Width of a rectangular, grounded post BG
Capacitance C
Capacitance $C_G$
Container capacitance $C_W$
Capacitance $C_X$
Diameter of a round electrode ØDE
Container resistance $R_W$
Receiver electrodes E1, E2, . . .
Ground G
Total number of electrodes K
Length L
Number of containers N
Number of effectively usable containers N1
Rows R
Resistance RA
Output signal r(t); r1(t) to rN(t)
Transmitter electrode S
Columns Sp
Input signal s(t)
Depth T
Depth of a rectangular grounded post TG
Positive supply voltage V+
Ground impedance $Z_G$
Container impedance $Z_W$
Crosstalk impedance $Z_X$
Complex impedances $Z_{tot}$, $Z1_{tot}$ to $ZN_{tot}$

The invention claimed is:

1. Laboratory equipment comprising at least one apparatus for the capacitive determination of the fill level in the individual containers of a group of regularly disposed containers of the same dimensions, wherein the apparatus comprises a transmitter electrode and a receiver electrode as well as a measuring circuit for carrying out a capacitive measurement, wherein said measuring circuit comprises a transmitting circuit and a receiving circuit and the apparatus comprises:
   a horizontal base plate with a plurality of electrodes which protrude in one direction in relation to a horizontal plane defined by the base plate and which are mutually uniformly spaced apart such that a plurality of working zones of the same dimensions are formed,
   multiple connections through which each of said plurality of electrodes is connectable with the transmitting circuit and controllable by said transmitting circuit thereby acting as a transmitter electrode and each of said plurality of electrodes is connectable with the receiving circuit and configured to be read out by said receiving circuit thereby acting as receiver electrodes,
   wherein,
   said plurality of electrodes are mutually uniformly spaced apart such that a working zone is formed between each electrode and its directly adjacent electrode(s), each working zone being configured to receive a container; and
   in the area of each working zone in the horizontal plane at least respectively two electrodes are opposite one another and wherein by means of said multiple connections respectively one of these two electrodes acts as transmitter and the other of the two electrodes acts as receiver.

2. The laboratory equipment according to claim 1, wherein the measuring circuit comprises a module for compensating or for minimizing the crosstalk between neighboring electrodes.

3. The laboratory equipment according to claim 1, wherein at least a part of said plurality of electrodes always serves as transmitter and another part of said plurality of electrodes—always serves as receiver.

4. The laboratory equipment according to claim 1, wherein said plurality of electrodes are an integral part of the base plate or that said plurality of electrodes are fastened on the base plate.

5. The laboratory equipment according to claim 1, wherein said apparatus comprises an evaluation module, which is arranged to evaluate signals of said plurality of electrodes serving as receivers.

6. The laboratory equipment according to claim 1, wherein temporarily one electrode per container is controllable as transmitter and one electrode can be read out as receiver such that based on a previously known, regular geometric arrangement in relation to electrodes of neighboring containers, a geometric suppression of crosstalk results through superposing electrical fields.

7. The laboratory equipment according to claim 1, wherein at least one electrode is temporarily or permanently grounded.

8. The laboratory equipment according to claim 5, wherein in the evaluation module an algorithm is implemented in order to be able to suppress crosstalk between neighboring containers in a computational manner.

9. The laboratory equipment according to claim 2, wherein in said module an algorithm is implemented in order to be able to suppress crosstalk between said plurality of electrodes of neighboring containers in a computational manner.

10. The laboratory equipment according to, claim 1 wherein the size and shape of the working zones is configured so that each working zone can receive a container of a laboratory plate, microplate, a striprack, a multiwell plate, or a microtiter plate.

11. The laboratory equipment according to claim 1, wherein said apparatus comprises a laboratory plate or a microplate or a striprack or a multiwell plate or a microtiter plate, which can be placed on the apparatus.

12. A capacitive measuring method for carrying out individual fill level measurements on a group of containers, which are disposed horizontally at a regular mutual distance adjacent to one another in a plurality of rows and/or columns, comprising the following steps:
   a. placing a laboratory plate, microplate, a striprack, a multiwell plate, or a microtiter plate comprising the group of containers onto a horizontal base plate with a plurality of pillar-like electrodes which protrude in one direction in relation to a horizontal plane defined by the base plate and which are mutually uniformly spaced apart such that a working zone is formed between each electrode and its adjacent electrode(s), each working zone being configured to receive a container;

b. controlling a first of said plurality of pillar-like electrodes, which is located adjacent to a first container with a transmitter signal;

c. evaluating a received signal which was received via a second electrode which is located at a distance with respect to the first electrode, wherein this second electrode is located opposite the first pillar-like electrode in relation to the first container, and d. repeating steps a., b., and c. for each container of the group, wherein respectively one electrode adjacent to the respective container serves as transmitter and an opposing electrode adjacent to the same container serves as receiver.

13. The method according to claim 12, wherein in addition to those electrodes which serve as transmitter or receiver, further electrodes are provided which are temporarily or permanently grounded.

14. The method according to claim 12, wherein at least one of said plurality electrodes is used as transmitter in one step and as receiver in another step.

15. The method according to-claim 12, wherein in a preparatory step the group of containers is placed from above onto an apparatus with said plurality electrodes, wherein the electrodes dip in intermediate spaces between the containers when attaching.

16. The method according to claim 12, wherein a multiplex method is used in order to successively load all electrodes serving as transmitters with a transmitted signal.

17. The method according to claim 12, wherein a multiplex method is used in order to be able to successively read out all electrodes serving as receivers.

18. The method according to claim 12, wherein by means of an algorithm crosstalk is minimized or compensated in a computational manner, wherein the algorithm factors in stored reference values of a reference measurement.

19. The method according to claim 12, wherein some of said plurality electrodes can receive predefined voltage potentials and that parasitic capacitances can thereby be rendered ineffective.

20. The method according to claim 12, wherein either one electrode pair is activated after the other or wherein two or more electrode pairs are activated simultaneously, wherein in this case electrode pairs are selected which are not directly adjacent.

* * * * *